(No Model.)
S. B. RICKERSON.
REDUCING LICORICE ROOT, &c., TO POWDER.
No. 437,244. Patented Sept. 30, 1890.
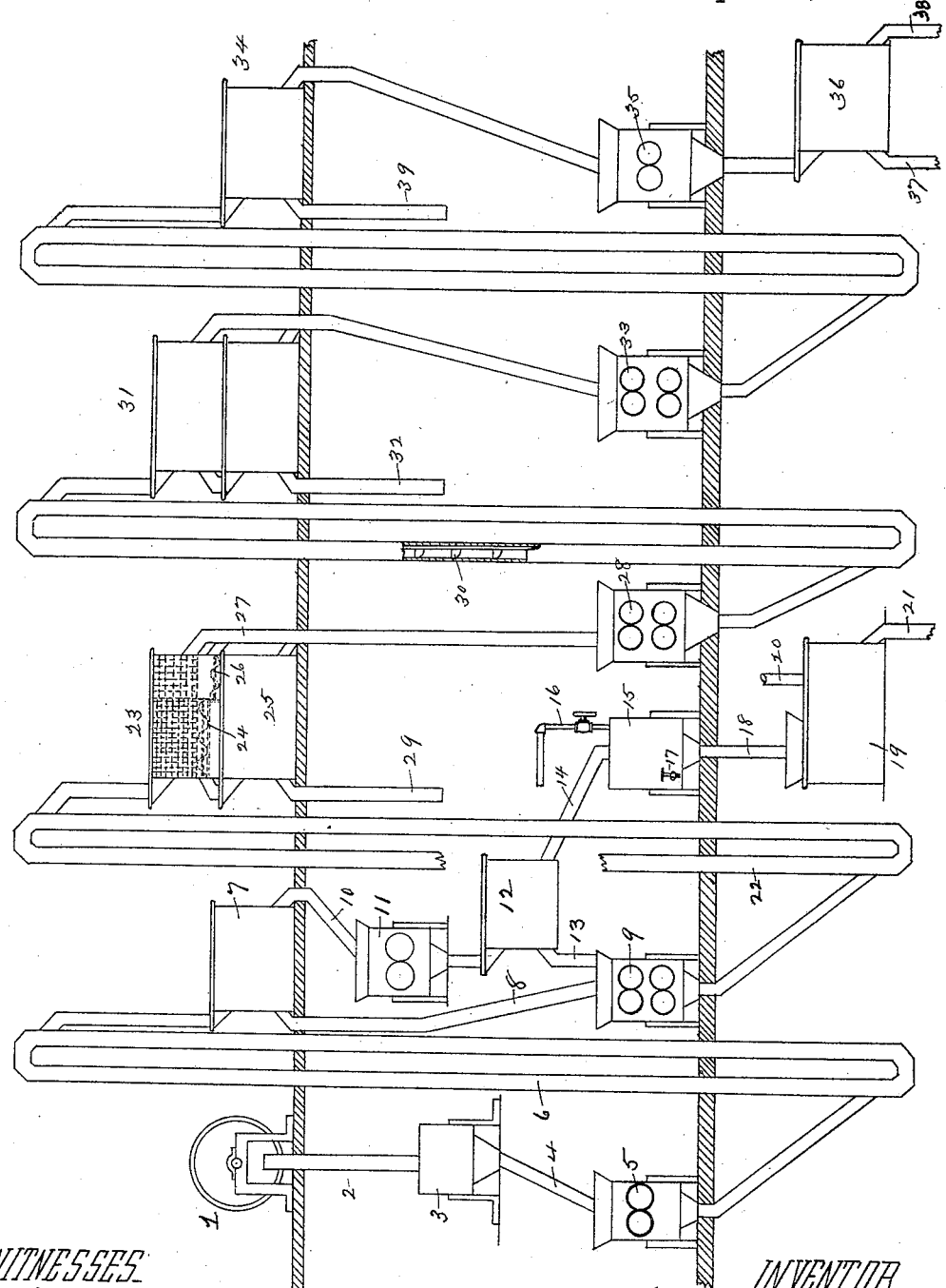
WITNESSES
Anna J. Lehaney
R. M. Pierott
INVENTOR
Sherman B. Rickerson
By Myers & Webster
Attys

UNITED STATES PATENT OFFICE.

SHERMAN B. RICKERSON, OF TOLEDO, OHIO, ASSIGNOR TO THE EXCELSIOR REDUCING COMPANY, OF SAME PLACE.

REDUCING LICORICE-ROOT, &c., TO POWDER.

SPECIFICATION forming part of Letters Patent No. 437,244, dated September 30, 1890.

Application filed June 23, 1890. Serial No. 356,383. (No model.)

*To all whom it may concern:*

Be it known that I, SHERMAN B. RICKERSON, of Toledo, in the county of Lucas and State of Ohio, have invented certain new and useful Improvements in a Method of and Apparatus for Reducing Licorice or other Roots; and I do hereby declare that the following is a full, clear, and exact description of the invention, which will enable others skilled in the art to which it appertains to make and use the same, reference being had to the accompanying drawing, and to the figures of reference marked thereon, which forms part of this specification.

This invention relates to a method of and apparatus for reducing licorice or other roots and separating and toughening the fibrous portions thereof.

Heretofore it has been customary to reduce licorice-root to a powder by the old and well-known process of mulling. While this process has been successful in a measure, yet it has been practically impossible to produce a high-grade product thereby, inasmuch as no provision has been made for separating the high and the low grades, or, in other words, the fibrous or outer portion of the root, which forms the low grade, and the heart or inner portion, which forms a high grade. In licorice-root there is a certain per cent. thereof that may be reduced to a powder, while the remaining portion retains its fibrous nature. In the old process above referred to, the entire mass is reduced together, thus permitting the high and the low grade to remain admixed throughout the operation, the resulting product being a low grade. It is the object of this invention to overcome this obstacle by providing a device which will effectively separate the high grade from the low grade and take the low grade thus separated and by submitting it to certain operations produce a marketable product of high value, while the high grade is also subjected to manipulations necessary to produce a high grade of powdered or pulverized root.

A further object of the invention is to produce a device which will enable the operation of reducing the root to be made a continuous one—that is, allowing a constant supply of root to be fed to the machine to compensate for that which has been reduced—in contradistinction to the old method of reducing a certain amount and then stopping the machine to remove the same previous to feeding afresh supply thereto.

A further object is to produce a machine capable of producing the above results which shall be of great simplicity of construction, durability in use, and cheapness of production.

With these objects in view the invention consists in providing a machine having a rumbler in which the root is first placed, a cutting device for cutting the root into any desired lengths, rollers for crushing the root, and a series of bolts and elevators for conveying the root from the rollers to the bolts.

The invention further consists in providing a rumbler, a cutter, differentially-geared rollers for crushing the root, a separator for separating the high and the low grade, a series of elevators for conveying the high grade to a series of bolts and crushing-rollers, and a conveyer for conveying the low grade to a steaming apparatus for toughening the same and to a drier.

The invention further consists in the various novel details of construction of a licorice-root-pulverizing machine, as will be hereinafter fully described in the specification, illustrated in the drawing, and pointed out in the claims.

In the accompanying drawing, forming part of this specification, and in which like numerals of reference indicate corresponding parts, I have illustrated one form of device embodying the essential features of my invention and one way of carrying my invention into effect, although the same result may be obtained in other ways and by different arrangement of parts without in the least departing from the spirit thereof, and in the drawing the figure is a side elevation of a machine, partly in section, showing the arrangement of the different parts of the same.

In carrying the invention into effect a series of differentially-geared rollers of different degrees of comminuting and pulverizing power are employed, together with a series of bolts for dividing the coarser particles of the root from the finer, a series of conveyers for conveying the said finer particles to a final finish, while the coarser particles are passed to a steaming device, in which they are thoroughly saturated by the steam, in order to toughen the same, and then passed to a drier, where the moisture in the root is evaporated. At every step of the operation—that is, after the high grade is passed between each separate set of rollers—there is a certain per cent. thereof that is powdered, and it is desirable to separate this from the coarser particles, so as to bring the latter into direct contact with the surface of the reducing-rollers, thus causing a more rapid pulverization than were the powdered particles allowed to remain therewith. For this purpose the bolts to which reference has been made are employed, and even here a double precaution is taken to prevent the possibility of the finer and coarser particles of the root becoming admixed, for instead of using a single bolt a double set is employed, whereby the finer particles which may have remained mixed with the coarser particles in passing through the first bolt are separated in passing through the second one. In addition to the above mechanism, there is also provision made for utilizing those parts of the root which were ordinarily wasted—such as the stems, bark, and fibrous parts—which will withstand the action of the rollers and are subjected to the action of steam, by which they are toughened and formed into a product to be used in toughening and binding tobacco, all of which will appear later on.

Referring to the drawing, 1 designates a rumbler, which may be of any preferred form and to which the root to be reduced is fed, in order that any dirt and the outside skin or cover may be removed therefrom previous to entering the machine proper. From the rumbler the root passes down a spout 2 into a cutting device 3, where it is cut into any desired lengths, and from that point passes down a spout 4 to the initial pair of crushing-rollers 5, which are differentially geared in the proportion of ten to one, and are corrugated with, say, four corrugations to the inch on the roller making the greatest number of revolutions and eight corrugations to the inch on the one making the fewest number. In passing between these rollers the root is crushed and broken and is conveyed by means of a conveyer 6 to a scalper 7, in which it undergoes a further disintegrating and dividing operation, the finer particles escaping down a chute 8 to a second set of crushing-rollers 9, while the coarser particles escape down a chute 10 to a set of rollers 11. The root is here again further crushed and passes to a second scalper 12, where all or nearly all of the high-grade is separated from the low-grade or fibrous part and is discharged down a chute 13 to the set of rollers 9, to which reference has been made, while the low grade passes down a chute 14 to a steam-box 15, the steam being conveyed thereto through a pipe 16, which connects with a boiler. The low grade here undergoes a thorough steaming process, and inasmuch as the steam condenses there will be a deposit in the bottom of the box of an elixir of licorice-root, which, being valuable, is drawn off through a cock 17 and is preserved. After having undergone a thorough steaming process, it is discharged down a chute 18 into a drier 19, where all the moisture is evaporated therefrom by means of hot air fed thereto through a pipe 20, after which it is discharged through a chute 21 and is collected for further use. The high grade is passed through a second series of rollers 9, consisting in this instance of four rollers, which may be of the same reducing-power or of different reducing-powers, as desired, and after having passed through these rollers is discharged into an elevator 22, which conveys it to a bolt 23, which is constructed, preferably, of two parts, one having, say, twelve meshes to the inch and the other eight meshes. As this bolt is revolved the finer particles escape through the first-named meshes onto a conveyer 24, which discharges it into a bolt 25, mounted immediately below the bolt 23, while the coarser particles escape to a conveyer 26 and are discharged into a chute 27, together with those particles left within the bolt and which are too coarse to escape through the meshes, and escape over the tail of the same into a chute 27, down which the two products pass to a third series of reducing-rollers 28, arranged the same as the second series, while the finer particles that enter the bolt 25 are discharged from a pipe 29 as a finished product. The coarser particles then undergo a third reduction between the rollers 28, and are conveyed by an elevator 30 to bolts 31, where they are again rebolted, the finished product escaping through a pipe 32, while the coarser particles are conveyed to a fourth series of crushing-rollers 33, from which they are discharged and elevated to a single bolt 34. The particles that reach this bolt are by this time so finely divided that by passing them through a series of smooth rollers 35 the product is thoroughly pulverized. After leaving the latter set of rollers the product is passed through a bolt 36, the resulting powder from this last reduction being a finished product, which escapes through a pipe 37, while that which is discharged from the bolt through the pipe 38 is refuse.

During the operation of pulverization the rumbler is kept constantly filled with the root, so that there is a constant discharge of the finished product from the pipes 29, 32, and 39, as well as from the bolt 36.

It will be readily seen from the foregoing description that by constructing a pulverizing-machine in the manner described the root can be powdered much more rapidly than by the old processes, as by eliminating the powdered product from the comminuted root at the end of each bolting operation the coarser particles are brought into direct contact with the surface of the rollers, thereby rendering the reduction much easier and more rapid than were the powdered product allowed to remain mixed with the coarser particles to the end of the operation. Moreover, by separating the fibrous portion of the root from the heart during the first stages of the operation a high and low grade can be produced, both of which will demand a high price on the market.

Having thus fully described my invention, what I claim as new, and desire to secure by Letters Patent, is—

1. In a device for reducing licorice or other roots, the combination of a rumbler, a cutting device, a series of initial crushing-rollers, a separator for separating the heart from the fibrous portion of the root, means for conveying the crushed root from the said rollers to the separator, and mechanism for conveying the said heart to a finish and the fibrous portion to a toughening device.

2. In a machine for reducing licorice-root, the combination of a rumbler, a cutting device, a series of initial crushing-rollers, a separator for separating the heart from the fibrous portion of the root, means for conveying the crushed root from the initial rollers to the separator, conveyers for conveying the fibrous portion of the root to a toughening device, a series of bolts, a series of differentially-geared rollers, and conveyers for conveying the heart from the separator to the said rollers.

3. In a machine for reducing licorice-root, the combination of a rumbler, a cutting device, a series of initial crushing-rollers, a separator for separating the heart from the fibrous portion of the root, mechanism for conveying the said heart to a series of bolts and differentially-geared rollers to a finish, and mechanism for conveying the fibrous part of the root to a steam-box and to a drier.

4. In a machine for reducing licorice-root, the combination of a series of initial crushing-rollers, a separator for separating the heart from the fibrous portion of the root, mechanism for conveying the said heart through a series of bolts and differentially-geared rollers to a finish, and mechanism for conveying the fibrous part of the root to a steam-box and to a drier.

5. The herein-described process of reducing and separating licorice-root, which consists in subjecting the same to the action of cleaning and cutting devices, passing it through initial crushing-rollers, and conveying the crushed product to a separator, where the fibrous portion is divided from the heart and subjected to the action of a toughening device, and the heart portion to a series of bolts and reducing-rollers to a finish.

6. The herein-described process of reducing licorice-root, which consists in subjecting the same to the action of reducing-rollers, scalpers, a toughening device, and bolts to a final finish.

In testimony that I claim the foregoing as my own I hereby affix my signature in presence of two witnesses.

SHERMAN B. RICKERSON.

Witnesses:
WILLIAM WEBSTER,
R. M. ELLIOTT.